United States Patent [19]
Lee

[11] Patent Number: 5,251,056
[45] Date of Patent: Oct. 5, 1993

[54] HIGH-SPEED LIGHT BEAM DEFLECTOR

[75] Inventor: J. Kelly Lee, Rochester, N.Y.

[73] Assignee: Eastman Kodak Company, Rochester, N.Y.

[21] Appl. No.: 923,405

[22] Filed: Jul. 31, 1992

[51] Int. Cl.$^5$ .......................................... G02B 26/08
[52] U.S. Cl. ..................... 359/224; 359/214
[58] Field of Search ............ 359/872, 846, 848, 213, 359/214, 223, 224, 199, 222, 227, 230, 578, 845, 847; 250/235

[56] References Cited

U.S. PATENT DOCUMENTS

| | | | |
|---|---|---|---|
| 1,438,974 | 12/1922 | Wente | 359/224 |
| 3,504,182 | 3/1970 | Pizzurro et al. | 250/199 |
| 3,544,201 | 12/1970 | Fowler et al. | 359/224 |
| 3,556,638 | 1/1971 | Banks et al. | 359/222 |
| 3,758,199 | 9/1973 | Thaxter | 359/224 |
| 3,902,783 | 9/1975 | Bodlaj | 359/221 |
| 3,928,778 | 12/1975 | Ivanow et al. | 359/223 |
| 3,981,566 | 9/1976 | Frank et al. | 359/224 |
| 4,264,809 | 4/1981 | Fernside | 250/201 |
| 4,325,637 | 4/1982 | Moore | 356/359 |
| 4,436,364 | 3/1984 | Lauer et al. | 359/214 |
| 4,705,365 | 11/1987 | Wakita et al. | 359/224 |
| 4,708,420 | 11/1987 | Liddiard | 359/199 |
| 4,711,573 | 12/1987 | Wijntjes et al. | 356/346 |
| 4,750,045 | 6/1988 | Ohara et al. | 358/285 |
| 4,778,233 | 10/1988 | Christenson et al. | 359/214 |
| 4,960,312 | 10/1990 | Razzaghi | 359/205 |
| 5,148,324 | 9/1992 | Van Amstel | 359/486 |

OTHER PUBLICATIONS

J. Kelly Lee, Reprint–Applied Optics, vol. 18, pp. 454–459, Feb. 15, 1979, Piezoelectric bimorph optical beam scanners: analysis and construction.

Hamamatsu Technical Data, Large–Area PSD Series (Long–Area 1D PSD and 2D PSD), pp. 1–8, Aug. 1989 (rev.).

*Primary Examiner*—Loha Ben
*Attorney, Agent, or Firm*—Mark Z. Dudley

[57] ABSTRACT

Improved, high-speed beam deflector includes unique piezoelectric plate and reflecting body structure, wherein parallel plates of piezoelectric material are bonded at selected locations on a reflecting body with flexible adhesive. The plates are operatively connected to a plate driving means to effect motion of the reflecting body in a push-pull arrangement. The resulting structure has a high resonant frequency even though a reflecting body in the form of relatively large glass mirror is employed.

11 Claims, 3 Drawing Sheets fn=fmax fn<<fmax fn<fmax

HIGH-SPEED LIGHT BEAM DEFLECTOR

CROSS REFERENCE TO RELATED APPLICATION

This application is related to commonly-assigned, copending U.S. patent application Ser. No. 07/923,404, filed concurrently herewith in the names of J. K. Lee et al. and entitled, "LIGHT BEAM SCANNING SYSTEM INCLUDING MEANS FOR CORRECTION OF CROSS SCAN ERROR", the disclosure of which is included herein by reference.

FIELD OF THE INVENTION

The present invention relates in general to light beam deflection apparatus, and in particular to a controllably positionable, high-speed light beam deflector.

BACKGROUND OF THE INVENTION

Information processing systems of the type that include light beam scanning, beam positioning, or beam tracking apparatus can benefit from the use of a controllably positionable light beam deflector. In high speed scanning or tracking systems, the beam deflecting mirror must be capable of rapidly and accurately directing an incident light beam to a desired location. Various mirror-type deflectors are known in the art. One type of deflecting mirror is electromagnetically driven and is commonly referred to as a galvanometer scanner. Beam deflectors of this type are expensive, complex, and can present hysteresis problems (see E.P. Grenda et al., "Closing the Loop on Galvo Scanners", Electro Optical Design, pp. 32-34, April, 1974).

Another type of beam deflector utilizes a mirror directly attached to a piezoelectric shear transducer that acts as a driver. The transducer driver is often referred to as a "bimorph" or a "bimorph bender". (See: J. J. Shaffer, et al., "Bender-Bimorph Scanner Analysis", Applied Optics, pp. 933-37, April, 1970; U.S. Pat. No. 3,544,201; U.S. Pat. No. 3,794,410; and U.S. Pat. No. 1,438,974). Bimorph scanners offer high performance, are simple in construction, and are low in cost. Because of these desirable characteristics, bimorph scanners have achieved general acceptance in the art. However, when evaluating a beam deflector, bandwidth becomes an important figure of merit. The practical limit for the bandwidth of a deflector may be taken as the fundamental resonant frequency $f_n$. Very little angular movement can be achieved in a mechanical beam deflector beyond its fundamental resonant frequency. A disadvantage of beam deflectors of the type described above is their low fundamental resonant frequency and corresponding low bandwidth. High speed operation of galvanometer mirrors have been achieved, but only with use of small mirrors.

Hence, in applications wherein the mirror must be relatively large, such as 25 mm by 12.5 mm with the larger face being the rotating face, the galvanometer designs of the prior art are not suitable. In certain applications the mirror must also be very flat (1/10th wave or better) for optical reasons, which necessitates the use of a thicker mirror. Movement of such a large mirror at speeds above 10,000 Hz has heretofore been difficult if not impossible to accomplish.

Galvanometer-based mirror systems are thus generally considered too slow to provide the rapid corrections that are necessary for particularly critical optical systems. (See, for example, J. D. Zook, "Light beam deflector performance", Appl. Optics, 12, pp. 875-887, April, 1974, wherein the performance of electromagnetic galvanometers is shown to be governed by an upper limit determined by materials properties and the allowable heat rise. A high speed, small angle galvanometer is mentioned but its construction is not disclosed.) J. K. Lee, in "Piezoelectric optical beam scanners: analysis and construction", Appl. Optics, 18, pp. 454-459, February, 1979, describes a number of piezoelectric galvanometers but their resonant frequencies are on the order of 1 khz or less. Beiser, in "Laser Scanning Systems", Laser Applications, Vol. 2, Academic Press, pp. 53-159, 1974 describes a high speed shear mode piezoelectric scanner, but the cost of the piezoelectric element disclosed therein is too high for many applications. Acousto-optic (AO) or electro-optic (EO) deflectors are also known for beam deflection at relatively high speeds; however, they are costly and necessitate additional beam shaping optics.

SUMMARY OF THE INVENTION

The present invention allows improved, high-speed beam deflection without undue cost by using a unique structure including dual piezoelectric plates and a reflecting body. The preferred embodiment includes parallel plates of piezoelectric material bonded at selected locations to a reflecting body with elastic adhesive. The plates are supported by a platform and are operatively connected to a plate driving means to effect motion of the mirror in push-pull arrangement with respect to the platform. The resulting beam deflector is simple to construct and operate and is extremely stiff. Therefore, the beam deflector has a high resonant frequency even though a relatively large mirror may be employed. A beam deflector may be constructed according to the invention to achieve a first resonant frequency of over 40,000 Hz, and is capable of effecting 100 arc seconds of high speed rotation of a reflecting body having dimensions of 2.5 cm by 1.25 cm.

Figure 1:
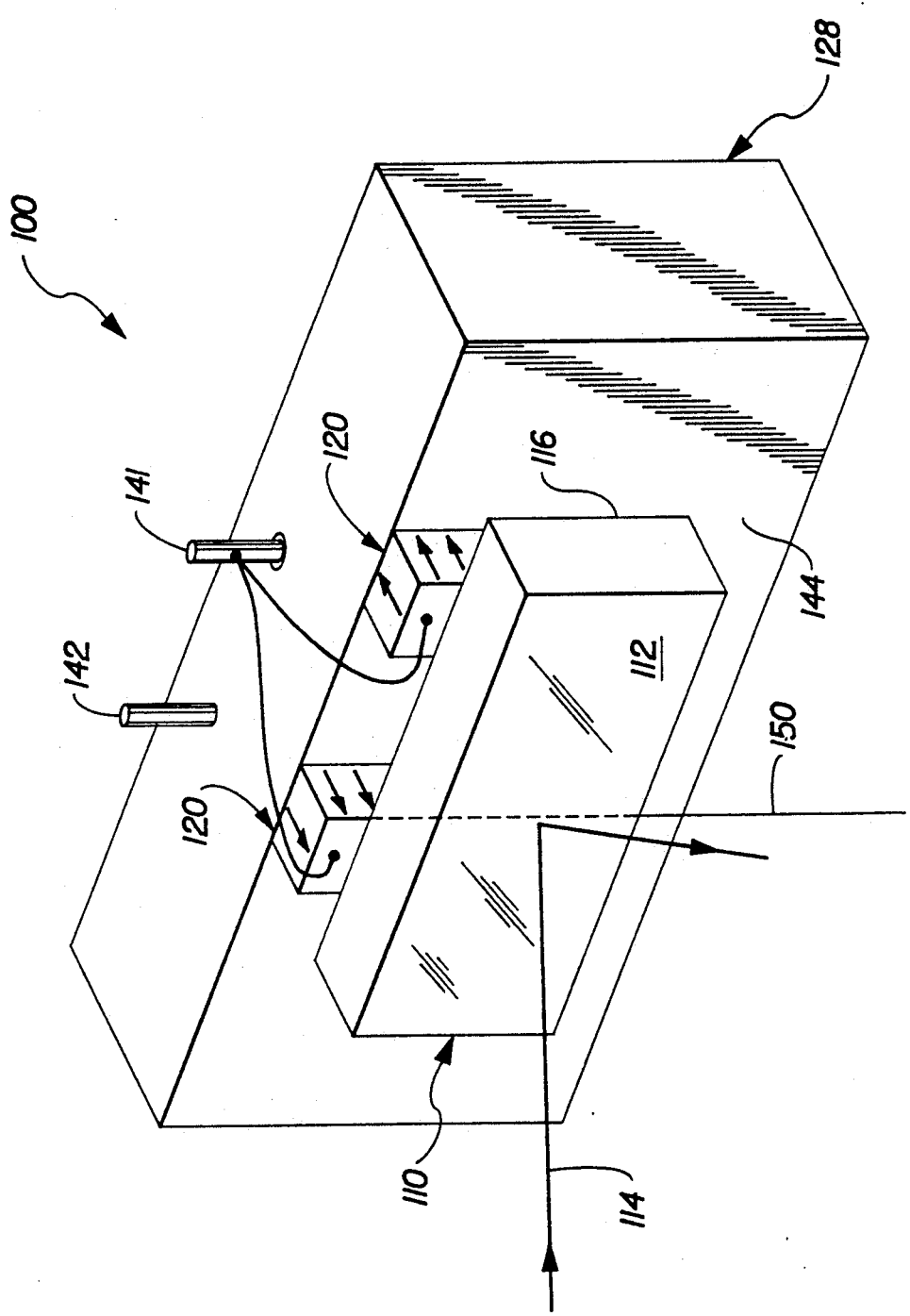
FIG. 1 is a side perspective view of an improved, high speed beam deflector constructed according to the present invention.

The invention, its objects, and advantages, will become more apparent in the detailed description of the preferred embodiments presented below.

DETAILED DESCRIPTION OF THE INVENTION

A preferred embodiment of the present invention will now be described with reference to the accompanying drawings, wherein like reference numerals refer to like components.

Figure 2:
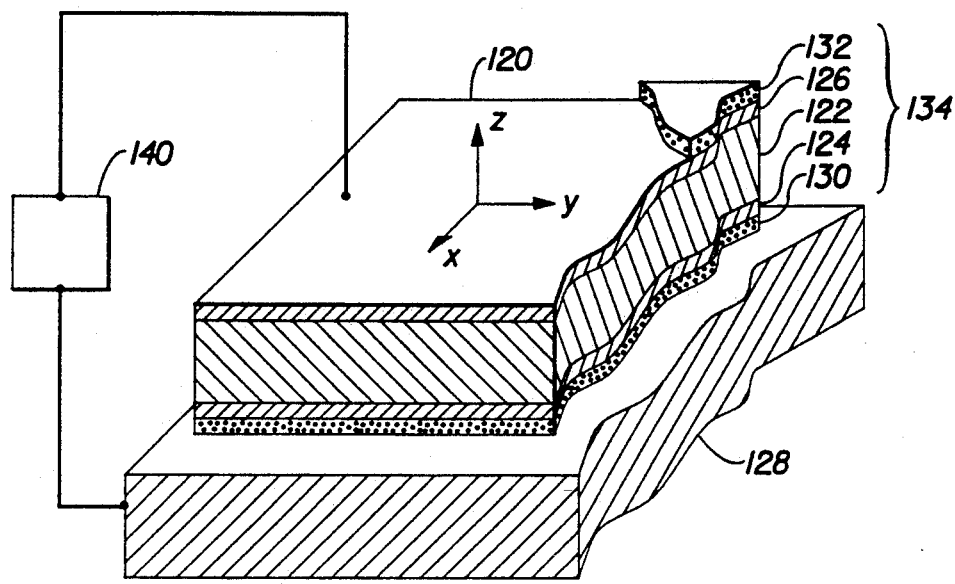
FIG. 2 is a schematic, cross-sectional illustration of a portion of one of the piezoelectric plates and the adjacent portion of the supporting platform in the beam deflector of FIG. 1.

FIGS. 1 and 2 show a preferred embodiment of a beam deflector 100 constructed according to the present invention. A beam reflecting body 110, preferably provided in the form of a planar glass mirror (of dimensions, for example, of 25 mm width, 12.5 mm height, and 6 mm thickness) includes a reflective coating 112 on its front surface. The contemplated mirror thickness is preferably selected in order to maintain a 1/10th wave surface quality with respect to the incident light beam 114. The back of the reflecting body 116 is rough polished for better bonding to first and second very thin piezoelectric plates 120 (each of dimensions, for example, of 4 mm width, 15 mm length, and 1 mm thickness) constructed of piezoelectric material 122 sandwiched between first and second electrodes 124,126 pairs. The piezoelectric material 122 is selected as one having a relatively high piezoelectric constant operable in the $d_{33}$ mode, which is characterized as having a piezoelectric polarization axis that is coaxially aligned with the predominant axis of the piezoelectric motion (expansion or contraction) of the piezoelectric material. Such piezoelectric material is commercially available in the form of lead zirconate titanate, from Morgan Matroc, Inc. as item PZT-5H.

Each plate 120 is mounted to a supporting platform 128 at a first plate electrode 124 via a first bonding layer 130 formed of conductive adhesive such as conductive silver-filled epoxy. The reflecting body 110 is bonded to the second (opposing) electrode 126 of each plate 120 via a second bonding layer 132 of flexible adhesive, such as a silicone rubber compound. The thickness of the second bonding layer 132 is preferably established at approximately 25 to 75 micrometers. As will be appreciated further in the description below, this construction allows the second bonding layer 132 to flex a small amount when the reflecting body is rotated. Nonetheless, the overall structure 134 formed of the combination of a piezoelectric plate 120 and first and second bonding layers 130,132 is relatively stiff because of its minimal thickness, and the expansion or contraction of each piezoelectric plate 120 with respect to the platform 128 is well-coupled to the reflecting body. The second bonding layer 132 also provides a small damping effect, for better control of the resultant rotation of the reflecting body about the rotation axis. The first and second plates 120 are mounted with respect to the platform 128 in opposing piezoelectric polarity, that is, the first plate would be poled up if the second plate is poled down, or vice-versa.

As further shown in FIG. 2, each piezoelectric plate 120 is electrically driven in parallel with the other. Connections from the plates 120 to a plate driving means 140 are made at the protruding ends of the plates via a first binding post 141 and at the platform via a second binding post 142 The platform 128 includes an integral conductive surface 144 that interfaces with the first plate electrode 124. The platform 128 is preferably formed of a solid conductive material, such as aluminum. The plate driving means 140 includes a suitable high voltage field source and other control circuit components that are selectable as known in the art and thus are not discussed here.

It is contemplated that both piezoelectric plates 120 are constructed and operated to effect a selected piezoelectric mode wherein an electric field applied along vector z results in an expansion or contraction of the plate along the same vector direction. Accordingly, with application of an electric field between the first and second plate electrodes 124,126 (i.e., along the z direction) of each plate 120, the thickness of a first plate will expand while the same dimension of a second plate contracts, or vice versa depending upon the polarity of the applied field. The reflecting body 110 will then tilt about a rotation axis 150, depending on the direction and magnitude of the applied voltage.

Figure 3:
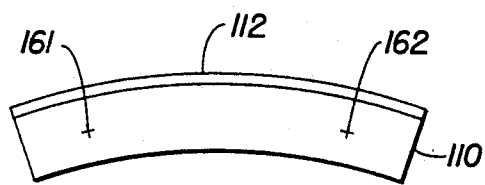
FIG. 3 is a simplified, side view of the beam reflecting body in the beam deflector of FIG. 1.
Figure 4:
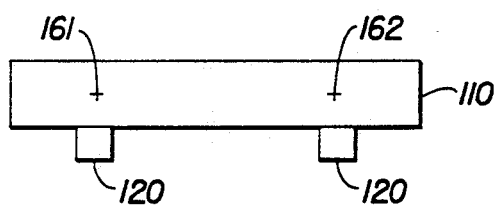
FIGS. 4, 5, and 6 illustrate respective side views of three plate and reflecting body arrangements considered in the development of the beam deflector in FIG. 1.
Figure 5:
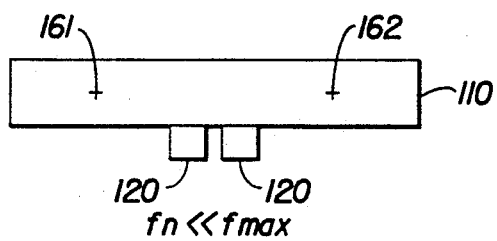
Figure 6:
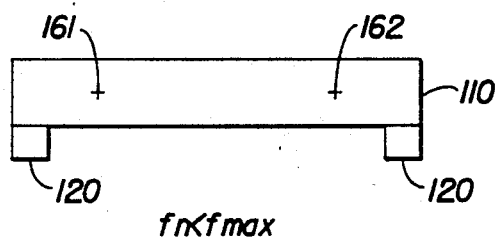

As shown in FIG. 3, and according to a particular feature of the invention, the reflecting body 110 may be considered to move as a free-free beam subject to deflection such that it exhibits first and second nodal points 161,162 in a first mode of vibratory movement. As shown in FIG. 4, and according to another particular feature of the invention, the first and second piezoelectric plates 120 are located respectively at these first and second nodal 161,162 points such that the resonant frequency of the system $f_n$ is maximized to its optimal extent $f_{max}$. In contrast to the desired configuration shown in FIG. 4, and as shown in FIGS. 5 and 6, the resonant frequency $f_n$ is lessened considerably when the piezoelectric plates are located at points other than the first mode nodal points 161,162.

Figure 7:
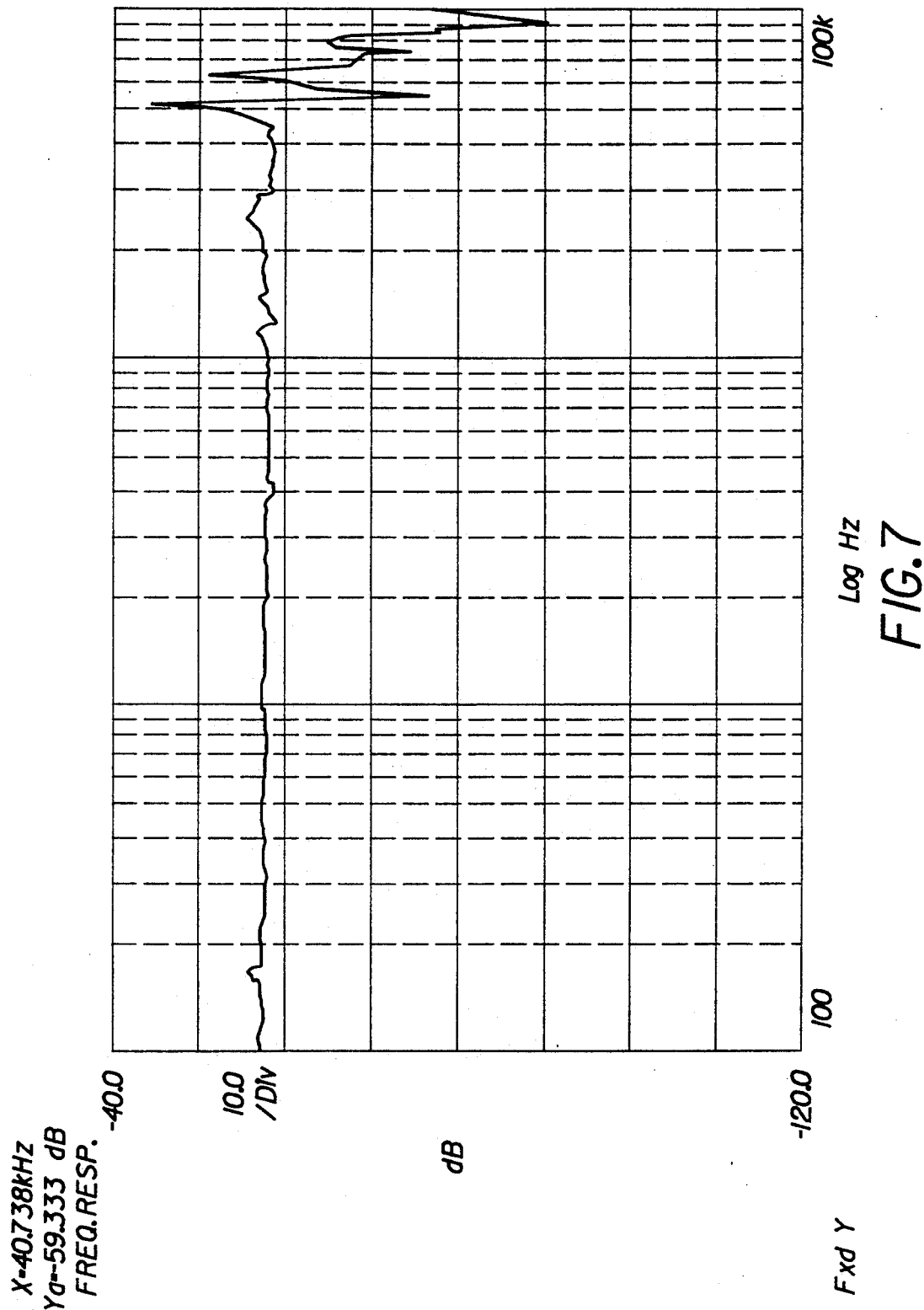
FIG. 7 is a plot of the measured frequency of a preferred embodiment of a beam deflector constructed according to the present invention.

The reflecting body can therefore be driven at a higher frequency than heretofore experienced in prior art beam deflectors. A beam deflector 100 constructed according to the arrangement of FIG. 4 is also capable of driving a reflecting body of larger than usual dimensions at a higher than usual frequency. As evidenced by the frequency response plot in FIG. 7, experimental versions of the contemplated beam deflector have been found to provide a first resonant frequency $f_n$ of over 40 kHz. Further, such extended resonant frequency is high enough for the beam deflector 100 to be used in either a closed loop or an open loop servo system. The contemplated beam deflector is also easy to assemble at a low cost, and due in part to the flexibility of the second bonding layer 130, achieves a low resonant system quality factor Q. The contemplated beam deflector 100 is therefore more easily controlled and offers greater beam positioning accuracy than prior art devices.

The invention has been described in detail with particular reference to a preferred embodiment thereof, but it will be understood that variations and modifications can be effected within the spirit and scope of the invention.

What is claimed is:

1. A high-speed beam deflector for use in deflecting a light beam incident thereon, comprising:
 a platform;
 first and second piezoelectric means, each means including a piezoelectric element operable in a $d_{33}$ mode, and means operatively connected to the piezoelectric element to operate the piezoelectric element in the $d_{33}$ mode;
 a reflecting body including a first reflective surface suitable for reflecting the light beam, and a second back surface;
 first means for operatively connecting the piezoelectric means to the platform; and
 second means for operatively connecting the reflecting body to the first and second piezoelectric means wherein piezoelectric expansion or contraction of each of said piezoelectric element according to said $d_{33}$ mode in the piezoelectric means is coupled to the reflecting body at a location substantially adjacent to a selected one of first and second nodal points of the reflecting body.

2. The beam deflector of claim 1, wherein each piezoelectric means further comprises a substantially uniform layer of piezoelectric material.

3. The beam deflector of claim 2, further comprising means for applying an electric field of predetermined polarity to the piezoelectric material.

4. The beam deflector of claim 3, wherein the electric field application means further comprises first and second conductive plate electrodes operatively connected to the layer of piezoelectric material.

5. The beam deflector of claim 4, wherein the piezoelectric material layer further comprises a compound of lead zirconate titanate.

6. The beam deflector of claim 4, wherein the platform further comprises a conductive surface.

7. The beam deflector of claim 6, wherein the first connecting means further comprises a substantially uniform layer of conductive expoxy interposed between the first plate electrode and the conductive surface of the platform.

8. The beam deflector of claim 4, wherein the second connecting means further comprises a substantially uniform layer of silicone rubber compound interposed between the second plate electrode and the reflecting body back surface.

9. The beam deflector of claim 2, wherein the piezoelectric means each have a substantially uniform thickness of between 0.5 and 1.5 millimeters.

10. The beam deflector of claim 1, wherein the reflecting body further comprises a planar glass mirror.

11. A high-speed beam deflector for use in deflecting a light beam incident thereon, comprising:
a platform having a conductive means at a face thereon;
first and second piezoelectric plates, each of which incorporates first and second plate electrodes and a layer of piezoelectric material operable in a $d_{33}$ mode therebetween, said first and second plate electrodes being operatively connected to the piezoelectric material to operate the piezoelectric material in the $d_{33}$ mode;
a mirror including a first reflective surface suitable for reflecting the light beam, and a second back surface,
first bonding means for operatively connecting the first plate electrodes to the conductive means; and
second bonding means for attaching the mirror at its back surface to the second plate electrodes;
wherein piezoelectric expansion or contraction of a selected one of said piezoelectric plates is coupled to the mirror at a location substantially adjacent to a selected one of first and second nodal points of the mirror.

* * * * *